US010443853B2

(12) United States Patent
Okada et al.

(10) Patent No.: US 10,443,853 B2
(45) Date of Patent: Oct. 15, 2019

(54) FUEL INJECTION DEVICE FOR GAS TURBINE

(71) Applicant: KAWASAKI JUKOGYO KABUSHIKI KAISHA, Kobe-shi, Hyogo (JP)

(72) Inventors: Kunio Okada, Kakogawa (JP); Atsushi Horikawa, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 877 days.

(21) Appl. No.: 15/051,993

(22) Filed: Feb. 24, 2016

(65) Prior Publication Data

US 2016/0169523 A1    Jun. 16, 2016

Related U.S. Application Data

(63) Continuation of application No. PCT/JP2014/072604, filed on Aug. 28, 2014.

(30) Foreign Application Priority Data

Oct. 11, 2013   (JP) .................................. 2013-213490

(51) Int. Cl.
  *F02C 3/30*   (2006.01)
  *F23R 3/28*   (2006.01)
  (Continued)

(52) U.S. Cl.
  CPC ............... *F23R 3/283* (2013.01); *F02C 3/20* (2013.01); *F02C 3/30* (2013.01); *F02C 3/305* (2013.01);
  (Continued)

(58) Field of Classification Search
  None
  See application file for complete search history.

(56) References Cited

U.S. PATENT DOCUMENTS 927,561 A  *  7/1909  Light .................. F23D 11/10
                                                239/405
1,369,688 A  *  2/1921  Mayer .................. F23D 11/10
                                                122/367.3
(Continued)

FOREIGN PATENT DOCUMENTS

DE          3609960 A1     10/1986
JP          49-40526    *  10/1975
(Continued)

OTHER PUBLICATIONS

Communication dated Aug. 22, 2017, from the Japanese Patent Office in counterpart Japanese application No. 2013-213490.
(Continued)

*Primary Examiner* — Gerald L Sung
*Assistant Examiner* — Marc J Amar
(74) *Attorney, Agent, or Firm* — Sughrue Mion, PLLC

(57) ABSTRACT

A fuel injection device, for a gas turbine, which enhances uniform distribution in concentration of fuel gas and water vapor in a combustion chamber with a simple structure and at low cost to effectively reduce NOx, is provided. The fuel injection device mixes fuel gas and water vapor and injects fuel gas and water vapor into a combustion chamber. The fuel injection device includes a nozzle housing having a mixing chamber, and the nozzle housing includes a first introduction passage to introduce fuel gas from an outer circumference of the nozzle housing in a circumferential direction of the mixing chamber; and a second introduction passage to introduce water vapor from the outer circumference of the nozzle housing in a circumferential direction of
(Continued)

the mixing chamber. Fuel gas and water vapor are swirled about an axis C of the mixing chamber and mixed in the mixing chamber.

7 Claims, 7 Drawing Sheets

(51) Int. Cl.
| | | |
|---|---|---|
| *F23D 11/10* | (2006.01) | |
| *F23D 11/16* | (2006.01) | |
| *F02C 3/20* | (2006.01) | |
| *F23D 17/00* | (2006.01) | |
| *F23C 1/04* | (2006.01) | |
| *F23R 3/36* | (2006.01) | |
| *F02C 7/22* | (2006.01) | |
| *F23L 7/00* | (2006.01) | |

(52) U.S. Cl.
CPC ............ *F02C 7/22* (2013.01); *F23C 1/04* (2013.01); *F23D 11/10* (2013.01); *F23D 11/16* (2013.01); *F23D 17/002* (2013.01); *F23L 7/005* (2013.01); *F23R 3/28* (2013.01); *F23R 3/36* (2013.01); *F23C 2900/9901* (2013.01); *F23K 2401/10* (2013.01)

(56) References Cited

U.S. PATENT DOCUMENTS

| | | | | |
|---|---|---|---|---|
| 1,381,095 | A * | 6/1921 | Starr | F23D 11/10 239/400 |
| 1,591,679 | A | 7/1926 | Hawley | |
| 2,566,040 | A * | 8/1951 | Simmons | F23D 11/105 239/11 |
| 3,758,259 | A * | 9/1973 | Voorheis | F23D 11/107 239/402.5 |
| 4,473,185 | A * | 9/1984 | Peterson | B05B 7/0416 239/405 |
| 4,614,490 | A | 9/1986 | Kiczek et al. | |
| 5,479,781 | A * | 1/1996 | Fric | F23C 3/006 60/740 |
| 5,974,780 | A * | 11/1999 | Santos | F02C 3/22 60/39.59 |
| 6,491,236 | B1 * | 12/2002 | Keller | F02C 3/30 239/399 |
| 6,715,295 | B2 * | 4/2004 | Gadde | F02C 3/30 60/39.3 |
| 6,755,359 | B2 * | 6/2004 | Sprouse | F23D 11/107 239/405 |
| 7,565,794 | B2 * | 7/2009 | Eroglu | F23C 7/002 60/39.463 |
| 7,581,379 | B2 * | 9/2009 | Yoshida | F01D 15/10 60/39.463 |
| 2005/0106520 | A1 * | 5/2005 | Cornwell | F23D 14/74 431/116 |
| 2010/0146984 | A1 | 6/2010 | Carroni et al. | |

FOREIGN PATENT DOCUMENTS

| | | |
|---|---|---|
| JP | 50-129708 U | 10/1975 |
| JP | 63-150432 A | 6/1988 |
| JP | 06-066156 A | 3/1994 |
| JP | 10-196401 A | 7/1998 |
| JP | 2000-002420 A | 1/2000 |
| JP | 20002420 A * | 1/2000 |
| JP | 2001-041454 A | 2/2001 |
| JP | 2003-279042 A | 10/2003 |
| JP | 2009-287888 A | 12/2009 |
| JP | 2010-535303 A | 11/2010 |

OTHER PUBLICATIONS

International Search Report of PCT/JP2014/072604 dated Oct. 28, 2014.
International Preliminary Report on Patentability dated Apr. 12, 2016 from the International Bureau in counterpart International Application No. PCT/JP2014/072604.

* cited by examiner

△ : COMBUSTION OF NATURAL GAS AND WATER VAPOR WITH CONVENTIONAL DEVICE

▲ : COMBUSTION OF $H_2$ GAS AND WATER VAPOR WITH CONVENTIONAL DEVICE

○ : COMBUSTION OF NATURAL GAS AND WATER VAPOR WITH PRESENT INVENTION DEVICE

● : COMBUSTION OF $H_2$ GAS AND WATER VAPOR WITH PRESENT INVENTION DEVICE

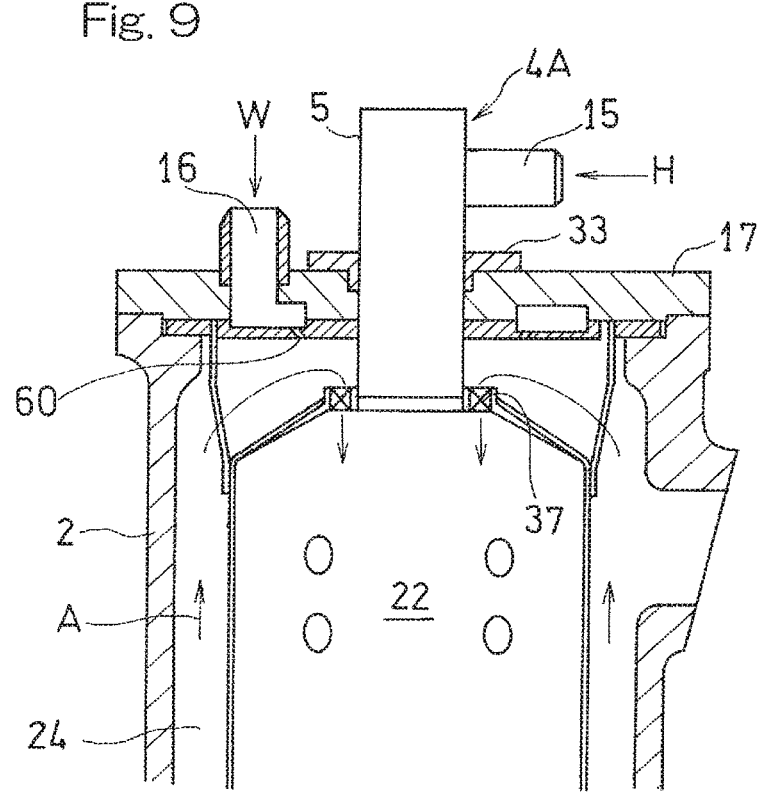

FUEL INJECTION DEVICE FOR GAS TURBINE

CROSS REFERENCE TO THE RELATED APPLICATION

This application is a continuation application, under 35 U.S.C. § 111(a), of international application No. PCT/JP2014/072604, filed Aug. 28, 2014, which claims priority to Japanese patent application No. 2013-213490, filed Oct. 11, 2013, the disclosure of which are incorporated by reference in their entirety into this application.

BACKGROUND OF THE INVENTION (Field of the Invention)

The present invention relates to fuel injection devices, for gas turbines, which allow NOx in exhaust gas to be efficiently reduced by premixing fuel gas such as hydrogen gas, and water vapor so as to make a distribution in concentration thereof uniform before injection thereof into combustors.

(Description of Related Art)

In recent years, for gas turbine systems, a technique of injecting fuel and water or water vapor into a combustor in order to reduce generation of NOx in exhaust gas and enhance efficiency of the system, has been developed (for example, Patent Document 1 to 3).

RELATED DOCUMENT

Patent Document

[Patent Document 1] JP Laid-open Patent Publication No. H06-66156
[Patent Document 2] JP Laid-open Patent Publication No. 2010-535303
[Patent Document 3] JP Laid-open Patent Publication No. H10-196401

SUMMARY OF THE INVENTION

However, in the fuel injection device disclosed in Patent Document 1, liquid fuel, water vapor, and gas fuel from the liquid fuel nozzle, the water vapor nozzle, and the gas fuel nozzle, are mixed in the combustion chamber only after the liquid fuel, the water vapor, and the gas fuel are injected into the combustor, and a distribution in concentration of the fuels and the water vapor in the combustion chamber thus becomes non-uniform, so that reduction of NOx contained in exhaust gas after combustion is insufficient. The fuel injection device disclosed in Patent Document 2 is provided in order to reduce a flame temperature by injection of hydrogen fuel having fine water droplets mixed therein. However, a specific configuration therefor is not disclosed, and thus effective reduction of NOx contained in exhaust gas after combustion cannot be expected. For the fuel injection device disclosed in Patent Document 3, a technique is disclosed in which liquid fuel and water vapor are premixed and then supplied to the nozzle, to reduce fuel injection pressure and thus reduce emission of NOx. However, additional equipment such as a mixer for premixing needs to be provided. Further, since liquid fuel is used as fuel, it is difficult to obtain a uniform distribution in concentration of the liquid fuel and the water vapor in the combustion chamber. Therefore, substantial reduction of NOx is also difficult.

An object of the present invention is to provide a fuel injection device, for a gas turbine, which allows a distribution in concentration of fuel gas and water vapor in a combustion chamber to be made uniform with a simple structure and at low cost to effectively reduce generation of NOx.

In order to attain the aforementioned object, a fuel injection device for a gas turbine according to the present invention is a fuel injection device which has a fuel nozzle configured to mix fuel gas and water vapor and inject the fuel gas and the water vapor into a combustion chamber. The fuel injection device includes: a nozzle housing having a mixing chamber thereinside; a first introduction passage configured to introduce the fuel gas into the mixing chamber in a tangential direction; and a second introduction passage configured to introduce the water vapor into the mixing chamber in a tangential direction. The mixing chamber is configured to swirl the fuel gas and the water vapor about an axis of the mixing chamber to mix the fuel gas and the water vapor.

In this configuration, since the fuel gas and the water vapor are mixed while being swirled about the axis of the mixing chamber of the nozzle housing, the fuel gas and the water vapor are mixed in the mixing chamber over a longer moving distance for a longer time period as compared to a case where the fuel gas and the water vapor are mixed without swirling the fuel gas and the water vapor. As a result, the fuel gas and the water vapor are sufficiently premixed, and a distribution in concentration of the fuel gas and the water vapor can be made uniform. The fuel gas and the water vapor are injected into the combustion chamber and combustion thereof is caused in a state where a distribution in concentration of the fuel gas and the water vapor is mad uniform, thereby achieving effective reduction of generation of NOx. Further, the fuel and vapor are premixed and then injected, whereby vapor can be effectively injected into combustion region, so that an amount of water vapor to be used can be reduced. Therefore, efficiency is enhanced in the entirety of the gas turbine system. Further, additional equipment such as a mixer for premixing need not be provided, and the fuel injection device also has a simple structure, whereby the device can be produced at low cost.

In the fuel injection device of the present invention, a plurality of the first introduction passages and a plurality of the second introduction passages may be provided, and the first introduction passages and the second introduction passages may be alternately arranged in a circumferential direction of the mixing chamber. In this configuration, the fuel gas from the first introduction passages and the water vapor from the second introduction passages can be uniformly introduced into the mixing chamber in the circumferential direction. Therefore, a distribution in concentration of the fuel gas and the water vapor in the mixing chamber can be made uniform with enhanced efficiency.

The fuel injection device of the present invention may include a single first supply path configured to supply the fuel gas to a plurality of the first introduction passages, and a single second supply path configured to supply the water vapor to a plurality of the second introduction passages. In this configuration, the plurality of the first introduction passages and the plurality of the second introduction passages are branched from the single first supply path and the single second supply path, respectively. Therefore, while the plurality of the first introduction passages and the plurality of the second introduction passages are provided, the structure of the fuel injection device can be simplified, and cost can be reduced.

The fuel injection device of the present invention may further include a center member disposed on an axis of the nozzle housing, in which the mixing chamber is formed on an outer periphery of the center member. In this configuration, the fuel gas and the water vapor introduced into the mixing chamber can be smoothly swirled about the center member, to promote uniform mixing.

The fuel injection device of the present invention may further include a cooling passage configured to supply cooling air to an outer surface of the center member. In this configuration, the outer surface of the center member heated by flames in the combustion chamber is cooled by the cooling air from the cooling passages, thereby preventing thermal damage of the center member.

In the fuel injection device of the present invention, a gas injection portion may be provided at an end portion of the nozzle housing. The gas injection portion may include: a gas injection hole to inject mixed gas from the mixing chamber into the combustion chamber; an air injection hole to inject air which has cooled the center member; and a nozzle block forming an end gas header chamber on an upstream side of the gas injection hole, and the cooling passage is preferably formed in the nozzle block.

In this configuration, the gas injection portion provided at the end portion of the nozzle housing includes the gas injection hole, the air injection hole, and the nozzle block, and the end gas header chamber and the cooling passages are formed by and in the nozzle block, whereby the structure is made compact. Thus, a space for mounting in the gas turbine system can be reduced. Further, the mixed gas has its speed reduced in the end gas header chamber, to further promote the mixing.

In the fuel injection device of the present invention, an intermediate gas head chamber may be formed between the mixing chamber and the nozzle block, and the nozzle block may have a plurality of communication paths that allow the intermediate gas head chamber and the end gas header chamber to communicate with each other. In this configuration, the mixed gas G has its speed reduced in the intermediate gas header chamber 44, and the mixed gas G that has passes through the plurality of communication paths 47 has its speed reduced again in the end gas header chamber 45, whereby the mixing is still further enhanced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 9 is a longitudinal cross-sectional view of a fuel injection device of comparative example used in the experiment shown in FIG. 8.

DESCRIPTION OF EMBODIMENTS

Figure 1:
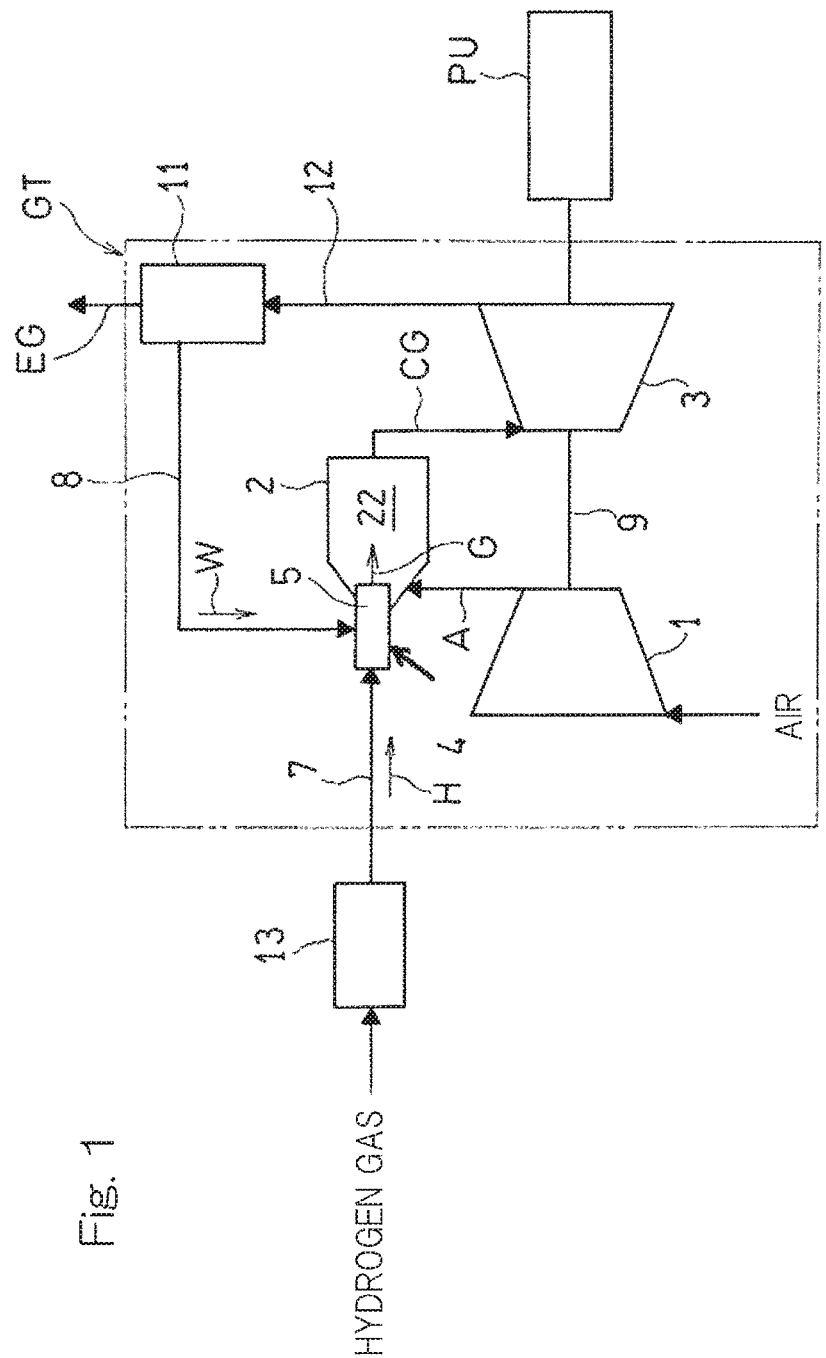
FIG. 1 is a schematic diagram illustrating a gas turbine system to which a fuel injection device according to an embodiment of the present invention is applied.

An embodiment of the present invention will be described below with reference to the drawings. FIG. 1 illustrates a gas turbine system to which a fuel injection device according to an embodiment of the present invention is applied. A gas turbine system GT shown in FIG. 1 includes: a compressor 1 configured to compress air A; a combustor 2; a turbine 3; and a boiler 11. The boiler 11 generates water vapor by using an exhaust gas EG discharged from the turbine 3 as a heat source.

A fuel injection device 4 is provided at a head portion of the combustor 2. The fuel injection device 4 includes a fuel nozzle 5 (FIG. 2) having a base end portion on the upstream side thereof connected with a single first supply path 7 through which fuel gas such as hydrogen gas H is supplied, and a single second supply path 8 through which water vapor W from the boiler 11 is supplied. The water vapor W is supplied in order to reduce a flame temperature which is locally high in a combustion chamber 22 of the combustor 2 for thereby suppressing generation of NOx. In the fuel injection device 4, the hydrogen gas H supplied through the first supply path 7 and the water vapor W supplied through the second supply path 8 are premixed to generate mixed gas G. Hydrogen gas is the most favorable as the fuel gas H. However, instead thereof, natural gas may be used for the fuel gas.

Combustion of the compressed air A supplied from the compressor 1 and the mixed gas G supplied from the fuel injection device 4 is caused in the combustion chamber 22 to generate high temperature, high pressure combustion gas CG. The generated combustion gas CG is supplied to the turbine 3 to drive the turbine 3. The compressor 1 is driven through a rotation shaft 9 by the turbine 3, and a load such as a generator PU is driven by the turbine 3.

The second supply path 8 has an upstream side end connected to the boiler 11. The boiler 11 is disposed on an exhaust passage 12 extending from the turbine 3, and waste heat recovered from the exhaust gas EG is utilized as a heat source for generating vapor in the boiler 11. The exhaust gas EG that has passed through the boiler 11 passes through a silencer (not shown), and is then discharged to the outside. Water is supplied to the boiler 11 from an external water supply (not shown).

The first supply path 7 has an upstream side end connected to a gas compressor device 13. The gas compressor device 13 compressed low pressure hydrogen gas that is supplied from a fuel supply (not shown) such as a hydrogen gas cylinder to generate high pressure hydrogen gas H, and subsequently the hydrogen gas H is supplied to the fuel injection device 4.

Figure 2:
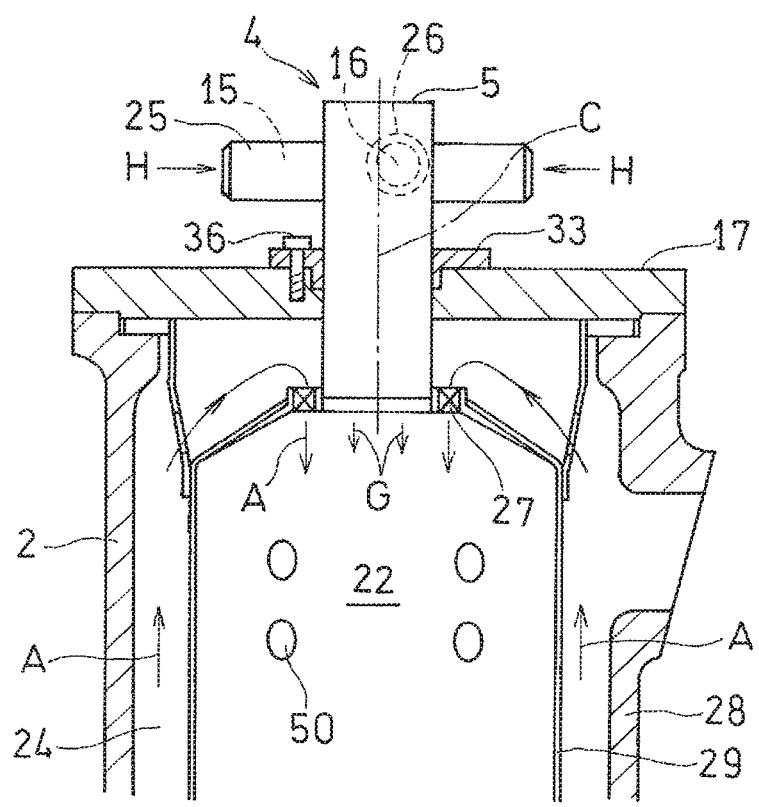
FIG. 2 is a longitudinal cross-sectional view of a main portion of a combustor having the fuel injection device.

FIG. 2 shows the head portion of the combustor 2. As shown in FIG. 2, the combustor 2 is of a single-can type, and includes, in a tubular housing 28, a combustion tube 29 that forms the combustion chamber 22. An end portion of the housing 28 is covered by a cover 17. The fuel injection device 4 is disposed so as to be concentric with the combustion tube 29, and is attached to the cover 17. The fuel nozzle 5 has, on the downstream side, an end portion which penetrates through the cover 17 and faces the combustion chamber 22. The fuel nozzle 5 has a base end portion on the upstream side which is connected with a first introduction tube 25 that forms a first introduction passage 15 for supplying the fuel gas H, and with a second introduction tube 26 that forms a second introduction passage 16 for supplying the water vapor W.

An air passage 24, through which the compressed air A compressed by the compressor 1 (FIG. 1) is sent into the combustion chamber 22, is formed on the outer periphery of the combustion tube 29. A portion of the compressed air A, which flows through the air passage 24, is introduced into the combustion chamber 22 through a swirler 27 disposed on the inner circumference of the air passage 24 and at the end portion of the combustion tube 29 so as to be swirled as indicated by the arrows. The other portion of the compressed air A is introduced into the combustion chamber 22 through a plurality of air holes 50 formed in the combustion tube 29.

Figure 3:
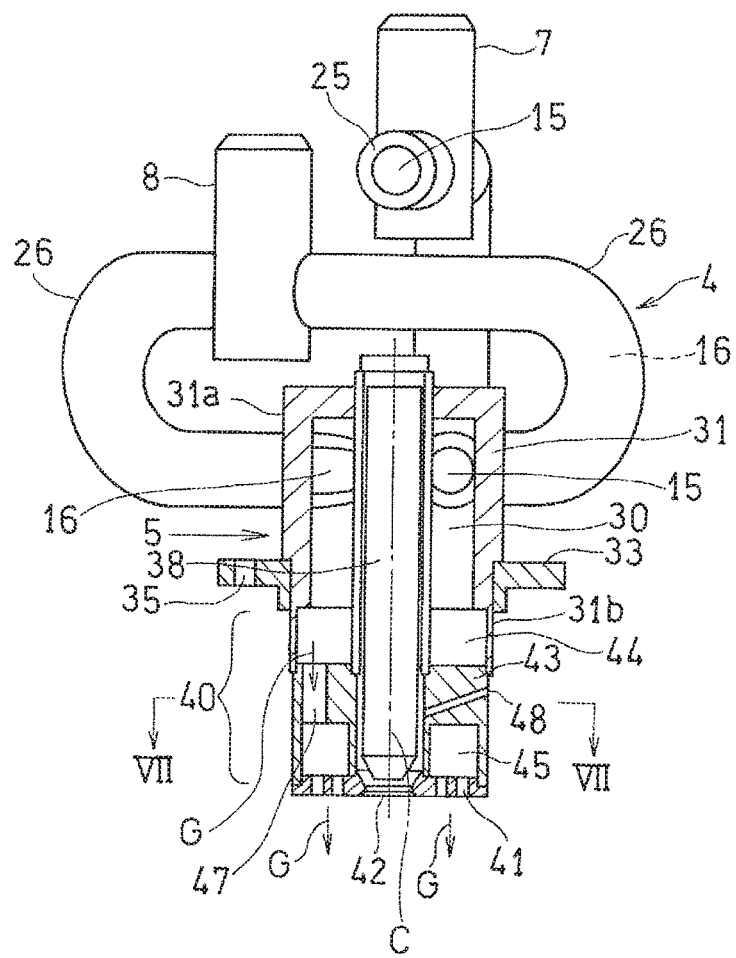
FIG. 3 is a longitudinal cross-sectional view of an internal structure of the fuel injection device.
Figure 4:
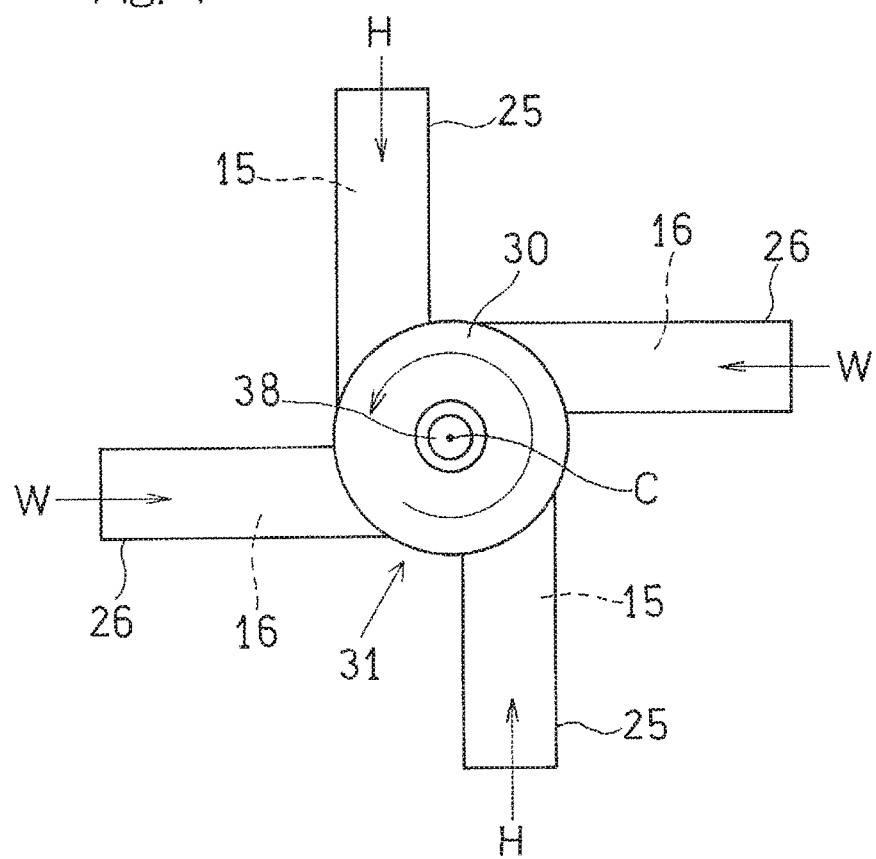
FIG. 4 is a schematic transverse cross-sectional view of the fuel injection device.

FIG. 3 shows an internal structure of the fuel injection device 4. As shown in FIG. 3, the fuel nozzle 5 includes a nozzle housing 31 having thereinside an annular mixing chamber 30, and the two first introduction passages 15, 15 and the two second introduction passages 16, 16 are connected to a base end portion 31a of the nozzle housing 31. As shown in FIG. 4, the two first introduction passages 15, 15 formed by the first introduction tubes 25, 25 are disposed so as to be spaced from each other by 180° about the nozzle housing 31. The two second introduction passages 16, 16 formed by the second introduction tubes 26 are also disposed so as to be spaced from each other by 180° about the nozzle housing 31. The first introduction passages 15 and the second introduction passages 16 are alternately arranged in the circumferential direction of the nozzle housing 31. Each of the first introduction passages 15 and each of the second introduction passages 16 introduce the fuel gas H and the water vapor W, respectively, from the outer circumference of the nozzle housing 31 in the circumferential direction of the mixing chamber 30, that is, into the mixing chamber 30 in a tangential direction. Thus, in the annular mixing chamber 30, the fuel gas H and the water vapor W are swirled about the axis of the mixing chamber 30 and mixed together.

A flange 33 is attached to a center portion, in the axial direction, of the nozzle housing 31. An insertion hole 35 is formed in the flange 33, and a bolt 36 shown in FIG. 2 is inserted into the insertion hole 35 and screwed into the cover 17, whereby the fuel injection device 4 is supported by the cover 17. A round-rod-like center member 38 is disposed on an axis C of the nozzle housing 31, and the mixing chamber 30 is formed on the outer periphery of the center member 38.

A gas injection portion 40 configured to inject the mixed gas G from the mixing chamber 30 into the combustion chamber 22 (FIG. 2) is disposed at an end portion 31b of the nozzle housing 31. The gas injection portion 40 has a gas injection hole 41 through which the mixed gas G is injected, an air injection hole 42; and a nozzle block 43 that forms an intermediate gas header chamber 44 and an end gas header chamber 45 on a side upstream of the gas injection hole 41. In the intermediate gas header chamber 44 on the upstream side, the mixed gas G obtained by mixture in the mixing chamber 30 is stored. The end gas header chamber 45 on the downstream side, and the intermediate gas header chamber 44 are connected through a plurality of communication paths 47. The end gas header chamber 45 communicates directly with the gas injection hole 41. Among the intermediate head chamber 44 and the end gas head chamber 45, the intermediate gas header chamber 44 on the upstream side may be dispensed with.

Figure 7:
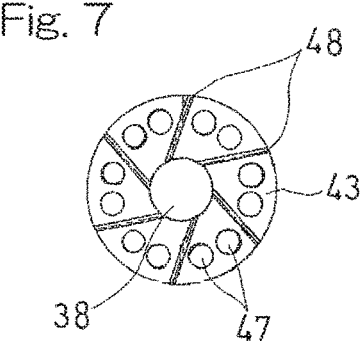
FIG. 7 is a cross-sectional view taken along a line VII-VII in FIG. 3.

The nozzle block 43 has a cooling passage 48 through which cooling air is supplied to the outer surface of the center member 38. The cooling passage 48 communicates with the air passage 24 shown in FIG. 2. A portion of the compressed air A is taken from the air passage 24 into the cooling passage 48 as the cooling air, to cool the center member 38 shown in FIG. 3, and then discharged through the air injection hole 42 into the combustion chamber 22 (FIG. 2). As shown in FIG. 7, a plurality (for example, six) of the cooling passages 48 are formed in the nozzle block 43 so as to be tangent to the circumference of the center member 38 and equally spaced from each other. The plurality of communication paths 47, 47 are provided between the cooling passages 48 and 48 adjacent to each other.

Figure 5:
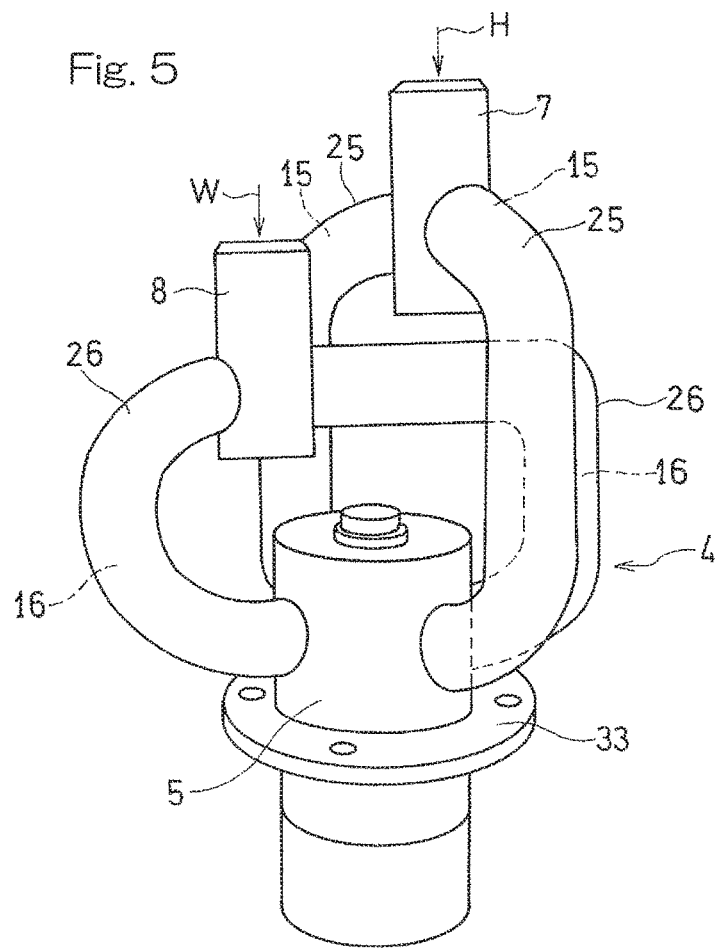
FIG. 5 is a perspective view of the fuel injection device.

FIG. 5 is a perspective view of the fuel injection device 4. As shown in FIG. 5, in the fuel injection device 4, the single first supply path 7 is connected to the two first introduction passages 15, 15 to supply the fuel gas H to the first introduction passages 15, 15. Similarly, the single second supply path 8 is connected to the second introduction passages 16, 16 to supply the water vapor W to the second introduction passages 16, 16.

Figure 6:
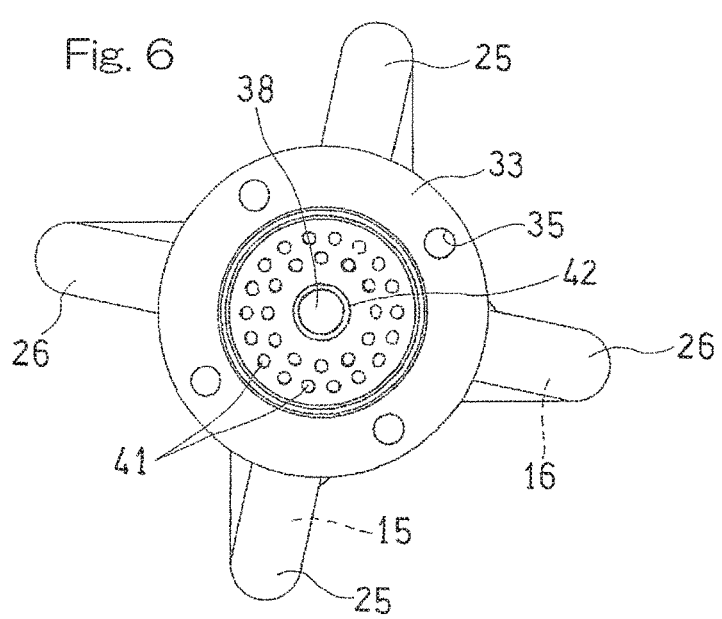
FIG. 6 is a bottom view of the fuel injection device.

FIG. 6 is a bottom view of the fuel injection device 4. A plurality of rows of the gas injection holes 41 are disposed around the air injection hole 42 positioned at the center portion of the fuel nozzle 5 so as to be concentric with each other, and the gas injection holes 41 are equally spaced from each other.

An operation of the fuel injection device will be described. When the gas turbine is actuated, as shown in FIG. 1, the fuel gas H is compressed by the gas compressor device 13, and then introduced from the first supply path 7 into the mixing chamber 30 through the first introduction passages 15 shown in FIG. 4. Meanwhile, the water vapor W generated in the boiler 11 shown in FIG. 1 is introduced from the second supply path 8 into the mixing chamber 30 through the second introduction passages 16 shown in FIG. 4. The mixing chamber 30 swirls the fuel gas H and the water vapor W about the axis C of the mixing chamber 30 to mix them. In the mixing chamber 30, since the fuel gas H and the water vapor W are so mixed while being swirled about the axis C of the mixing chamber 30, the fuel gas H and the water vapor W are mixed in the mixing chamber 30 over a longer moving distance for a longer time period as compared to a case where the fuel gas H and the water vapor W are mixed without being swirled. As a result, the fuel gas H and the water vapor W are sufficiently premixed, and a distribution in concentration of the fuel gas H and the water vapor W can be made uniform.

In the fuel injection device 4, the fuel and vapor are premixed and then injected, whereby vapor can be effectively injected into combustion region, so that an amount of water vapor to be used can be reduced. Therefore, efficiency is enhanced in the entirety of the gas turbine system. Further, additional equipment such as a mixer for premixing need not be provided, and the fuel injection device 4 can have a simple structure, and can be produced at low cost.

As shown in FIG. 3, the mixed gas G enters the intermediate gas header chamber 44 from the mixing chamber 30, and further enters the end gas header chamber 45 through the plurality of communication paths 47, and is injected through the gas injection holes 41 into the combustion chamber 22 shown in FIG. 2. The uniformity of the mixed gas G is enhanced in the intermediate and end gas header chambers 44, 45 due to reduction in speed. The mixed gas G injected through the gas injection holes 41 is mixed with the compressed air A introduced from the air passage 24 into the combustion chamber 22 through the swirler 27, and the air introduction holes 50, and combustion thereof is caused. In this way, combustion of the mixed gas G having a uniform distribution in concentration is caused, whereby NOx contained in the exhaust gas discharged from the combustion chamber 22 is reduced.

As shown in FIG. 5, the plurality of the first introduction passages 15 and the plurality of the second introduction passages 16 are provided, and the first introduction passages 15 and the second introduction passages 16 are alternately arranged in the circumferential direction of the mixing chamber 30, whereby the fuel gas H from the first introduction passages 15 and the water vapor W from the second introduction passages 16 can be uniformly introduced in the circumferential direction of the mixing chamber 30. Therefore, a distribution in concentration of the fuel gas H and the water vapor W in the mixing chamber 30 can be made uniform with enhanced efficiency.

As shown in FIG. 3, the single first supply path 7 through which the fuel gas H is supplied to the plurality of the first introduction passages 15, and the single second supply path 8 through which the water vapor W is supplied to the plurality of the second introduction passages 16, are provided, and the plurality of the first introduction passages 15 and the plurality of the second introduction passages 16 are thus branched from the single first supply path 7 and the single second supply path 8, respectively. Therefore, while the plurality of the first introduction passages 15 and the plurality of the second introduction passages 16 are provided, the structure of the fuel injection device 4 can be simplified, and cost can be reduced.

The center member 38 is disposed on the axis C of the nozzle housing 31, and the mixing chamber 30 is formed on the outer periphery of the center member 38. Therefore, the fuel gas H and the water vapor W introduced into the mixing chamber 30 can be smoothly swirled about the center member, to promote uniform mixing.

The cooling passages 48 for supplying cooling air to the outer surface of the center member 38 are provided. Therefore, the outer surface of the center member 38 heated by flames in the combustion chamber 22 is cooled by the cooling air from the cooling passages 48, thereby preventing thermal damage of the center member 38.

As shown in FIG. 3, the gas injection portion 40 provided at the end portion 31b of the nozzle housing 31 includes the gas injection holes 41 through which the mixed gas G is injected from the mixing chamber 30 into the combustion chamber 22, the air injection hole 42 through which air is injected after the center member 38 is cooled, and the nozzle block 43 that forms the end gas header chamber 45 on the upstream side of the gas injection holes 41. The cooling passages 48 are formed in the nozzle block 43. Therefore, the gas injection portion 40 at the end portion of the nozzle housing 31 has the gas injection holes 41, the air injection hole 42, and the nozzle block 43, and the end gas header chamber 45 and the cooling passages 48 are formed by and in the nozzle block 43, whereby the structure is made compact. Thus, a space in which the fuel injection device 4 is disposed can be reduced in a case where the fuel injection device 4 is mounted to the gas turbine system. The mixed gas G has its speed reduced in the end gas header chamber 45, to further enhance the mixing.

As shown in FIG. 3, the intermediate gas header chamber 44 is disposed between the mixing chamber 30 and the nozzle block 43, and the nozzle block 43 has the plurality of communication paths 47 that allow the intermediate gas header chamber 44 and the end gas header chamber 45 to communicate with each other. Thus, the mixed gas G has its speed reduced in the intermediate gas header chamber 44, and the mixed gas G that has passed through the plurality of communication paths 47 has its speed reduced again in the end gas header chamber 45, whereby the mixing is still further enhanced.

Figure 8:
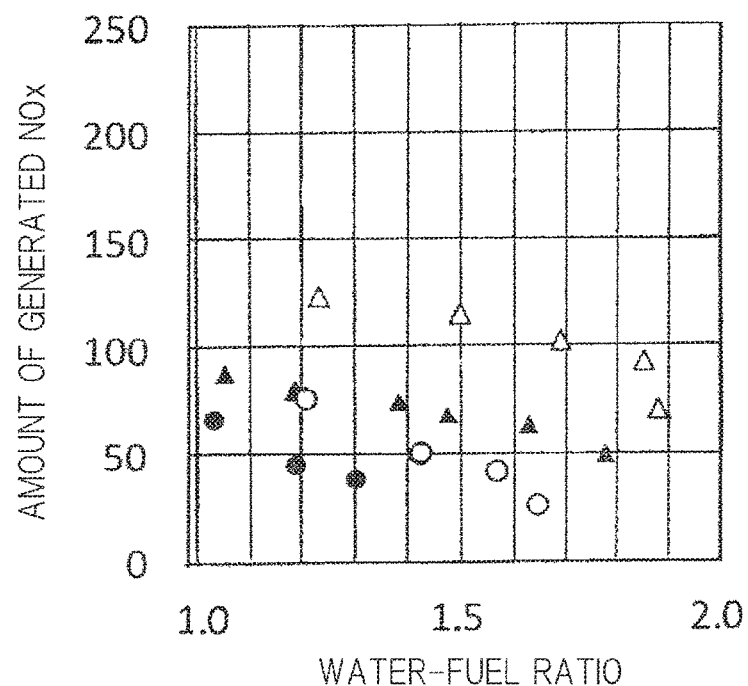
FIG. 8 shows a graph representing an amount of NOx generated in the case of the fuel injection device of the present invention being used, and an amount of NOx generated in the case of a conventional fuel injection device being used, the amounts of NOx being obtained by an experiment.

FIG. 8 shows a NOx reduction effect obtained by the fuel injection device 4 according to the present invention. FIG. 8 shows a graph obtained by measuring, in an experiment, an amount of NOx generated in the case of the fuel injection device 4 of the present invention being used, and an amount of NOx generated in the case of a fuel injection device 4A of comparative example being used. FIG. 9 shows a longitudinal cross-section of the fuel injection device 4A used in the experiment. The fuel injection device 4A corresponds to the device disclosed in Patent Document 1. In the fuel injection device 4A, only the fuel gas H is injected from the fuel injection device 4A into the combustion chamber 22, and the water vapor W passes through the second introduction passage 16 that penetrates through the cover 17, and is supplied from a water vapor nozzle 60 through the swirler 27 into the combustion chamber 22, and the fuel gas H and the water vapor W are mixed in the combustion chamber 22 only after both of them are supplied into the combustion chamber 22.

In FIG. 8, the black triangle represents an amount of NOx generated in a case where combustion of natural gas and water vapor is caused by the conventional device, the white triangle represents an amount of NOx generated in a case where combustion of hydrogen gas and water vapor is caused by the conventional device, the black circle represents an amount of NOx generated in a case where combustion of natural gas and water vapor is caused by the device of the present invention, and the white circle represents an amount of NOx generated in a case where combustion of hydrogen gas and water vapor is caused by the device of the present invention. It is proved that, in the case where the device of the present invention is used, regardless of whether fuel to which water vapor is added is hydrogen gas or natural gas, generation of NOx tends to be reduced according to a water-fuel ratio that is a weight ratio between water vapor and fuel gas being increased, as compared to the conventional device.

Although the present invention has been fully described in connection with the embodiments thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

GT . . . Gas turbine system
2 . . . Combustor

4 . . . Fuel injection device
5 . . . Fuel nozzle
7 . . . First supply path
8 . . . Second supply path
15 . . . First introduction passage
16 . . . Second introduction passage
22 . . . Combustion chamber
25 . . . First introduction tube
26 . . . Second introduction tube
30 . . . Mixing chamber
31 . . . Nozzle housing
38 . . . Center member
40 . . . Gas injection portion
41 . . . Gas injection hole
42 . . . Air injection hole
43 . . . Nozzle block
44 . . . Intermediate gas header chamber
45 . . . End gas header chamber
47 . . . Communication path
48 . . . Cooling passage
A . . . Compressed air
C . . . Axis of mixing chamber
EG . . . Exhaust gas
G . . . Mixed gas
H . . . Hydrogen gas (Fuel gas)
W . . . Water vapor

What is claimed is:

1. A fuel injection device, for a gas turbine, that mixes fuel gas and water vapor and injects the fuel gas and the water vapor into a combustion chamber, the fuel injection device comprising:
    a nozzle housing having a mixing chamber formed inside the nozzle housing, and a gas injection portion provided on downstream side of the mixing chamber;
    a first introduction passage configured to introduce the fuel gas into the mixing chamber in a circumferential direction of the mixing chamber; and
    a second introduction passage configured to introduce the water vapor into the mixing chamber in the circumferential direction of the mixing chamber;
    wherein the gas injection portion includes:
        a nozzle block;
        a first gas header chamber formed on an upstream side of the nozzle block;
        a second gas header chamber formed on a downstream side of the nozzle block;
        a plurality of communication paths, formed in the nozzle block, through which the first gas header chamber and the second gas header chamber communicate with each other; and
        a gas injection hole, and
    wherein the mixing chamber is configured to swirl the fuel gas and the water vapor about an axis of the mixing chamber to mix the fuel gas and the water vapor so that the resultant mixture gas is injected to the combustion chamber from the injection hole, through the first gas header chamber and the second gas header chamber.

2. The fuel injection device for a gas turbine as claimed in claim 1, comprising a plurality of the first introduction passages and a plurality of the second introduction passages are provided, wherein the first introduction passages and the second introduction passages are alternately arranged in a circumferential direction of the mixing chamber.

3. The fuel injection device for a gas turbine as claimed in claim 1, comprising a single first supply path configured to supply the fuel gas to a plurality of the first introduction passages, and a single second supply path configured to supply the water vapor to a plurality of the second introduction passages.

4. A fuel injection device, for a gas turbine, that mixes fuel gas and water vapor and injects the fuel gas and the water vapor into a combustion chamber, the fuel injection device comprising:
    a nozzle housing having a mixing chamber formed inside the nozzle housing:
    a first introduction passage configured to introduce the fuel gas into the mixing chamber in a circumferential direction of the mixing chamber;
    a second introduction passage configured to introduce the water vapor into the mixing chamber in the circumferential direction of the mixing chamber; and
    a center member disposed on an axis of the nozzle housing, wherein the mixing chamber is formed on an outer periphery of the center member,
    wherein the mixing chamber is configured to swirl the fuel gas and the water vapor about an axis of the mixing chamber to mix the fuel gas and the water vapor.

5. The fuel injection device for a gas turbine as claimed in claim 4, further comprising a cooling passage configured to supply cooling air to an outer surface of the center member.

6. The fuel injection device for a gas turbine as claimed in claim 5, wherein a gas injection portion is provided at an end portion of the nozzle housing, the gas injection portion includes a gas injection hole to inject mixed gas from the mixing chamber into the combustion chamber; an air injection hole to inject air which has cooled the center member, and a nozzle block forming an end gas header chamber on an upstream side of the gas injection hole, and the cooling passage is formed in the nozzle block.

7. The fuel injection device for a gas turbine as claimed in claim 6, wherein an intermediate gas head chamber is formed between the mixing chamber and the nozzle block, and the nozzle block has a plurality of communication paths that allow the intermediate gas head chamber and the end gas header chamber to communicate with each other.

* * * * *